UNITED STATES PATENT OFFICE.

EDWARD A. WHITCOMB AND JOHN J. RIDDLE, OF CINCINNATI, OHIO, ASSIGNORS OF NINE-SIXTEENTHS TO MARY E. KING, OF SAME PLACE.

WELDING-FLUX.

SPECIFICATION forming part of Letters Patent No. 341,785, dated May 11, 1886.

Application filed October 4, 1883. Renewed October 1, 1885. Serial No. 178,747. (No specimens.)

*To all whom it may concern:*

Be it known that we, EDWARD A. WHITCOMB and JOHN J. RIDDLE, citizens of the United States, and residents of Cincinnati, in the county of Hamilton and State of Ohio, have invented certain new and useful Improvements in Welding-Fluxes, of which the following is a specification.

Our invention relates to an improved flux for welding and brazing.

The object of our invention is to provide a flux which will more thoroughly clean and prepare the metal for welding or brazing, which will, in addition to these properties, prevent the oxidation and decarbonization of the metals being heated for welding or for hammering or drawing.

It is difficult to weld steel without decarbonizing it by overheating, and the effort to avoid this frequently results in heating the metal at too low a temperature, and, consequently, preventing a thorough union of the fiber. It is also difficult with some kinds of steel to heat and hammer or draw it into the required shape without either producing too much of a scale, and hence loss of metal, or by working it at too low a temperature, injuring the homogeneousness of the texture.

Our invention has for its object the overcoming of these difficulties by the use of a flux which will melt readily and adhere tenaciously to the metal, which may be worked at a very high red heat without deterioration of the metal.

In our application filed June 18, 1883, we have described one method of making our improved flux. Our present application contemplates a different method of making the same to accomplish the same general results as therein specified.

We have discovered that a superior flux may be made from fluor-spar and a proper sulphate, sulphate of lime being preferred; but sulphate of soda or sulphate of potassium may be used in lieu of sulphate of lime with a less degree of efficiency.

The preferred formula of making our flux is as follows: Take fluor-spar, one part; sulphate of lime, two parts; thoroughly pulverize and mix them, when they are ready for use as a welding-flux, in the same manner as borax is usually employed by the mechanic. This formula contemplates the use of fluor-spar having about forty-eight per cent. of calcium to fifty-two parts of fluorine; but these proportions may be varied considerably without impairing the efficiency of the flux. So, also, the proportions may be varied by using an alkaline carbonate with the sulphate in combination with fluor-spar; but we do not wish to limit ourselves to the use of those additional articles, as they may be employed or left out and still accomplish the general purposes of our invention. So, too, alum or borax may be added to vary the peculiar qualities of the flux, and still such use would be included in the claims herein set forth.

Instead of using fluor-spar, fluoride of calcium and an alkaline sulphate may be combined when obtained from other products than fluor-spar and still accomplish the same object; but we do not wish to limit ourselves to the particular mode of obtaining the fluoride of calcium.

What we desire to claim as our invention is—

1. A flux composed of fluor-spar and sulphate of lime mechanically mixed, substantially as herein specified.

2. A flux composed substantially of fluoride of calcium and sulphate of lime mechanically mixed, substantially as herein specified.

In testimony whereof we have hereunto set our hands.

EDWARD A. WHITCOMB.
JOHN J. RIDDLE.

Witnesses:
JNO. E. JONES,
A. GLUCHOWSKY.